United States Patent [19]

Pierce

[11] Patent Number: 5,320,026
[45] Date of Patent: Jun. 14, 1994

[54] SPRING BRAKE ACTUATOR WITH DUST GUARD

[75] Inventor: William C. Pierce, North Muskegon, Mich.

[73] Assignee: Anchorlok Corp., Muskegon, Mich.

[21] Appl. No.: 16,837

[22] Filed: Feb. 16, 1993

[51] Int. Cl.$^5$ ............................................. F01B 7/00
[52] U.S. Cl. ........................................ 92/63; 92/87; 92/130 A
[58] Field of Search ............... 92/48, 63, 87, 130 R, 92/130 A, 141

[56] References Cited

U.S. PATENT DOCUMENTS

| | | |
|---|---|---|
| 2,992,630 | 7/1961 | Leighton et al. |
| 3,244,079 | 4/1966 | Herrera. |
| 3,696,711 | 10/1972 | Berg et al. ............... 92/130 A |
| 3,811,365 | 5/1974 | Gordon et al. |
| 3,908,520 | 9/1975 | Ma. |
| 3,911,795 | 10/1975 | Gibbons ................... 92/63 |
| 3,943,829 | 3/1976 | Newstead et al. .......... 92/130 A |
| 4,031,814 | 6/1977 | Lukens et al. |
| 4,263,840 | 4/1981 | Herrera. |
| 4,565,120 | 1/1986 | Gray et al. ............... 92/63 |
| 4,960,036 | 10/1990 | Gummer et al. |

FOREIGN PATENT DOCUMENTS

| | | |
|---|---|---|
| 2325848 | 12/1973 | Fed. Rep. of Germany ... 92/130 A |
| 2327632 | 12/1973 | Fed. Rep. of Germany ......... 92/63 |
| 2458404 | 6/1976 | Fed. Rep. of Germany ......... 92/63 |

Primary Examiner—Thomas E. Denion
Attorney, Agent, or Firm—Varnum, Riddering, Schmidt & Howlett

[57] ABSTRACT

A dust guard is provided for a brake actuating mechanism comprising a housing having first and second end walls, an elastomeric diaphragm suspended within the housing, a brake actuating rod disposed within the housing for reciprocating movement relative to the housing and having a first end and a second end, the second end being directed towards the second end wall of the housing, and a spring disposed within the second chamber between the second end wall and the diaphragm. The dust guard comprises a resilient tubular barrier, attached at one to the second end wall, and extending inwardly axially to engage the actuating rod, or structure connected to the actuating rod, to isolate the second end of the actuating rod from the interior of the housing.

18 Claims, 6 Drawing Sheets

5,320,026

SPRING BRAKE ACTUATOR WITH DUST GUARD

BACKGROUND OF THE INVENTION

1. Field of the Invention

The invention relates to air-operated diaphragm brakes for vehicles and particularly to combination service and spring brake actuator assemblies having a dust guard on the spring brake.

2. State of the Prior Art

An air brake system for a vehicle such as a bus, truck or the like typically includes a brake shoe and drum assembly which is actuated by means of an actuator assembly operated by the selective application of compressed air. Conventional air brake actuators have both a service brake actuator for actuating the brakes under normal driving conditions by the application of compressed air and a spring-type emergency brake actuator which causes actuation of the brakes when air pressure has been released. The emergency brake actuator includes a strong compression spring which forces application of the brake when air is released. This is often referred to as the spring brake.

Typically, the spring brake actuator is disposed in tandem with the service brake actuator. When full pressure is applied to the spring brake actuator, air pressure acting against a diaphragm compresses the spring. A spring brake actuator rod is held in a retracted position by a relatively small return spring, thus not affecting the operation of the brake. When the brake is to be applied during normal driving operation, compressed air is provided to the service brake actuator which, acting against a diaphragm, causes a service brake push rod to be extended and causes the brakes to be applied with an application force which is proportional to the air pressure applied to the service brake actuator. In the event of a loss of air pressure or an intentional exhaustion of air from the spring brake actuator, the brake will be mechanically activated by the force of the emergency brake spring acting on the spring brake actuator rod which in turn acts upon the service brake push rod to apply the brakes. Thus, the spring brake portion serves both as a parking brake and an emergency brake.

U.S. Pat. No. 5,105,727, issued Apr. 21, 1992 to Bowyer discloses a spring brake assembly which includes both a spring brake portion and a service brake portion. The service brake portion includes an air chamber partially defined by a flexible service diaphragm acting against a service brake push rod and a return spring to assure proper release of the brake when air is exhausted from the air chamber. The spring brake portion also includes an air chamber partially defined by a spring brake diaphragm acting against a spring pressure plate to compress the emergency brake spring when air pressure is supplied to the chamber. An actuating rod extends through the spring brake diaphragm to integrally connect with the pressure plate. In operation, it is pushed outwardly from the chamber through a housing opening and bearing provided with a pneumatic seal to engage the service diaphragm and push rod of the service brake and thereby cause the brake to be applied. The spring brake diaphragm is provided with a centrally disposed aperture having an annular edge and the actuator rod extends through the opening and engages the annular edge to form an airtight seal. The actuator rod is hollow with a central bore and a brake releasing caging bolt extends into the central bore. An end plate on the bolt engages the spring brake pressure plate to draw the spring to a compressed state when the spring is caged by rotation of the bolt.

SUMMARY OF THE INVENTION

The spring brake actuator according to the present invention provides a dust seal about the entrance to the hollow actuator tube to help keep it free from a build-up of dirt, dust and grime.

The invention relates to a brake actuating mechanism comprising a housing having first and second end walls with an opening centrally disposed in the first end wall. An elastomeric diaphragm suspended within the housing divides the housing interior into a first chamber and a second chamber. The diaphragm has a centrally disposed opening. A hollow brake actuating rod is disposed substantially in the first chamber for reciprocating movement between a retracted position and an extended position. The actuating rod has an interior space, a first end, and a second end. The first end extends through the opening in the first end wall, and the second end is open and extends into the second chamber through the diaphragm opening. The brake actuating mechanism has a dust guard comprising a flexible tubular barrier having a first end and a second end. The tubular barrier second end sealingly engages the second end wall, and the tubular barrier first end projects into the second chamber from the second end wall in a position to sealingly engage the actuator. When the actuating rod is in the retracted position, the interior space thereof will thus be effectively isolated from the remainder of the second chamber.

In one aspect of the invention, the first end of the barrier is open and adapted to sealingly engage the actuator only when the second end of the actuating rod is in the retracted position. Preferably, the brake actuating mechanism has a spring disposed within the second chamber between the second end wall and the diaphragm, and an annular flange extending outwardly radially from the second end of the dust guard, is disposed between the spring and the second end wall of the housing to attach the dust guard to the second end wall. Preferably, the thickness of the wall of the barrier reduces in the direction of the first end to more readily receive the actuator.

In a further aspect of the invention, the first end of the dust guard is attached to the actuator, and the barrier is flexible so that the first end of the dust guard can move with the actuator without breaching the dust guard. Flexibility can be aided by annular accordion folds on the barrier.

With a spring disposed within the second chamber between the second end wall and the diaphragm, first and second annular flanges extend outwardly radially from the first and second end respectively of the dust guard. The first annular flange is disposed between the spring and the actuator to attach the dust guard to the actuator, and the second annular flange is disposed between the spring and the second end wall of the housing to attach the dust guard to the second end wall.

A further aspect of the invention is adapted for a spring brake comprising a housing having first and second end walls, an elastomeric diaphragm suspended within the housing and dividing the interior thereof into a first chamber and a second chamber, a brake actuating rod disposed within the housing for reciprocating movement between an extended position and a retracted position and having a first end and a second end, the second end being disposed within the second chamber and directed towards the second end wall of the housing, and a spring disposed within the second chamber between the second end wall and the diaphragm. A dust guard is provided having a resilient tubular barrier with a first end and a second end. The second end sealing engages the second end wall, and the first end projects into the second chamber from the second end wall in a position to effectively isolate the actuating rod second end from the remainder of the second chamber when the actuating rod is in the retracted position.

DETAILED DESCRIPTION

Figure 1:
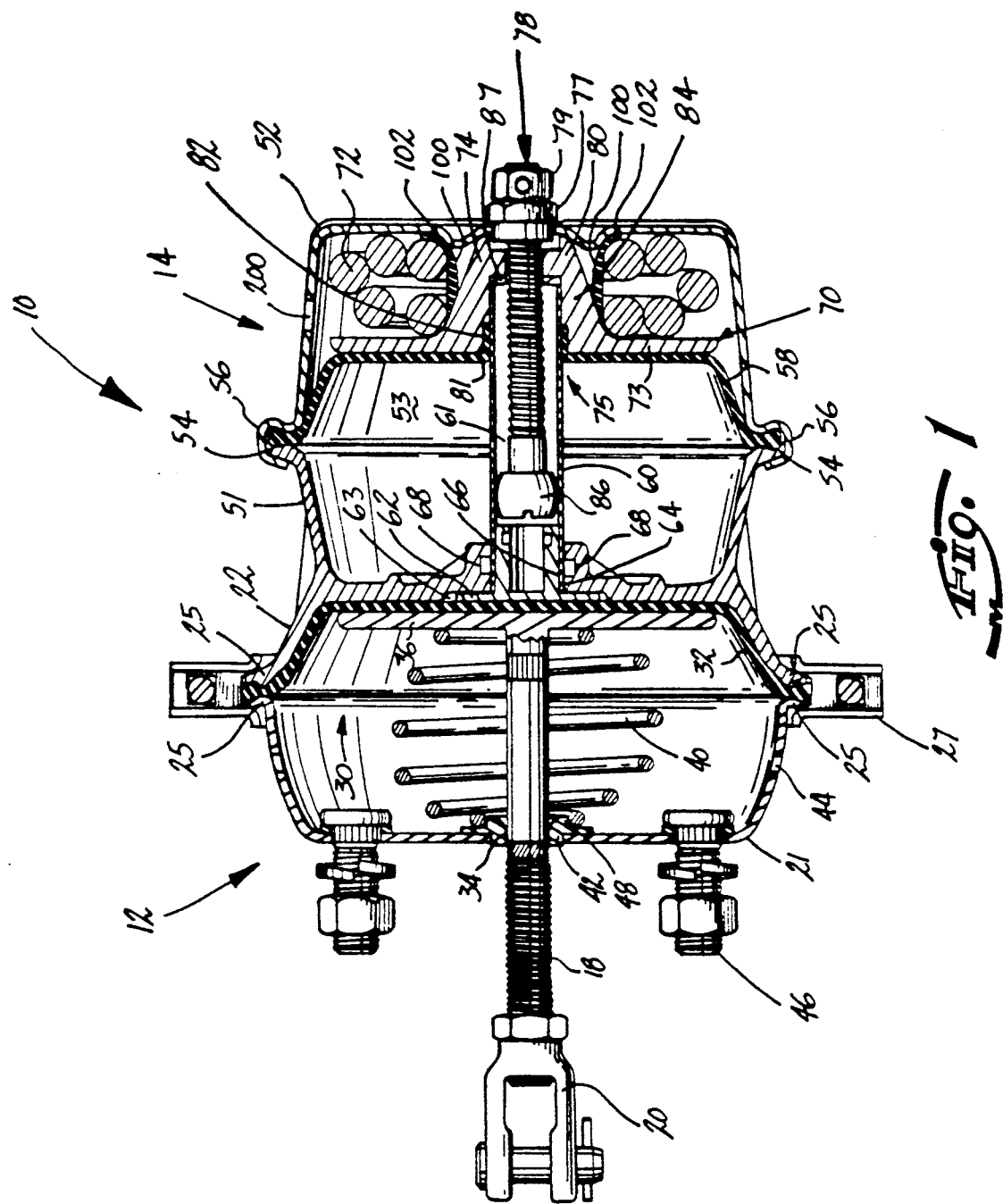
FIG. 1 is a cross-sectional view of an air-operated brake actuating assembly having a spring brake actuator arrangement in accordance with the principles of this invention.

FIG. 1 shows a cross-sectional view of an air-operated brake actuating unit 10 having a general configuration well known in the art. The actuating unit 10 comprises a service brake portion 12 mounted in tandem to a spring brake or emergency brake portion 14. A service brake push rod 18 extends from the service brake 12 for reciprocating motion and is provided with a clevis 20 which is adapted to connect to a conventional brake shoe and drum (not shown in the drawing) in a standard fashion. Reciprocating motion of the push rod 18 will cause the brake to be alternately applied and released.

The service brake 12 comprises a pair of facing cup shaped housing sections 21 and 22, each having an outwardly directed flange edge 25. The housing sections 21 and 22 are clamped together at their flange edges by means of a clamp 27 to form a service brake inner chamber 30. An elastomeric diaphragm 32 is suspended within the inner chamber 30 and is compressed at the peripheral edge thereof between flange edges 25 of the housing sections 21 and 22. The service brake push rod 18 extends through a central opening 34 in housing section 21 and into the service brake chamber 30 where it terminates in a pressure plate 36. A return spring 40 extends between pressure plate 36 and the interior surface of the housing section 21. A push rod guide 42 is disposed around the central opening 34 and has a spring seat 48 which receives one end of the compression spring 40 to retain it in position around the opening 34. The spring 40 thus tends to urge the pressure plate 36 and the service brake push rod 18 to a fully retracted position as depicted in FIG. 1.

To operate the service brake, compressed air is introduced through an air service port in housing section 22 (not shown in the drawing) to force the diaphragm 32 and pressure plate 36 against the force of spring 40 to actuate the push rod 18. Openings 44 are provided in the housing section 21 to allow for the rapid evacuation of air from the inner chamber 30. Mounting studs 46 are provided to mount the brake actuating unit 10 onto a brake assembly.

The spring brake 14 comprises a pair of facing cup shaped housing sections 51 and 52 joined at their edges to form an inner chamber 53. Housing section 51 is provided with an outwardly directed circumferential flange edge 54. The housing sections 51 and 52 are clamped together by means of a peripheral curved edge 56 on housing section 52 engaging edge 54 on housing section 51. An elastomeric diaphragm 58 is suspended within the spring brake chamber 53 and is compressed at its peripheral edge between the edges 54, 56 of housing sections 51 and 52. The portion of the chamber 53 between the diaphragm 58 and housing section 51 forms an air chamber which is filled with compressed air supplied through an air service port in housing section 51 (not shown in the drawing) when the emergency brake is in its normal released position.

An actuator rod 60, aligned with push rod 18, has a distal end extending through a central opening 64 in an end wall of housing section 51. The distal end of actuator rod 60 terminates in a reaction plate 62 disposed in an annular seat 63 in an end wall of housing section 22. Opening 64 is provided with a bearing 66 having at least one annular recess which accommodates at least one O-ring seal 68. Bearing 66 forms a bearing surface for actuator rod 60 and the O-ring 68 seals the pressure chamber in the service brake 12 from the pressure chamber in the spring brake 14. The proximal end of actuator rod 60 extends through a centrally disposed aperture 81 in the diaphragm 58 and terminates in a pressure plate 70 which engages spring brake compression spring 72. The pressure plate 70 comprises a substantially flat portion 73 engaging one end of spring 72 and a tubular portion 74 extending generally axially along the axis of spring 72. The tubular portion 74 is press-fit onto an end portion of actuator rod 60 such that the pressure plate 70 and the rod 60 form an integral unit. The pressure plate 70 may be formed of cast aluminum. The combination of the actuator rod 60, pressure plate 70 and diaphragm 58 may be termed an actuator 75.

During normal operation of the brake 10, the actuator rod 60 will be in the fully retracted position, as depicted in FIG. 1, by means of compressed air which is maintained in the portion of the chamber 53 defined by the diagram 58 and housing section 51. When the compressed air is exhausted, the compression spring 72, one end of which engages the outer end wall of housing section 52, forces the pressure plate 70 and rod 60, integrally attached to the pressure plate, in the direction of the brake push rod 18 of the service brake 12. The housing section 22 of the service brake 12 and housing section 51 of the spring brake 14 may be steel shells attached to each other by means of a circumferentially extending weld bead 76 or other suitable attachment means. Typically, however, the housing section 22 is a casting.

Figure 2:
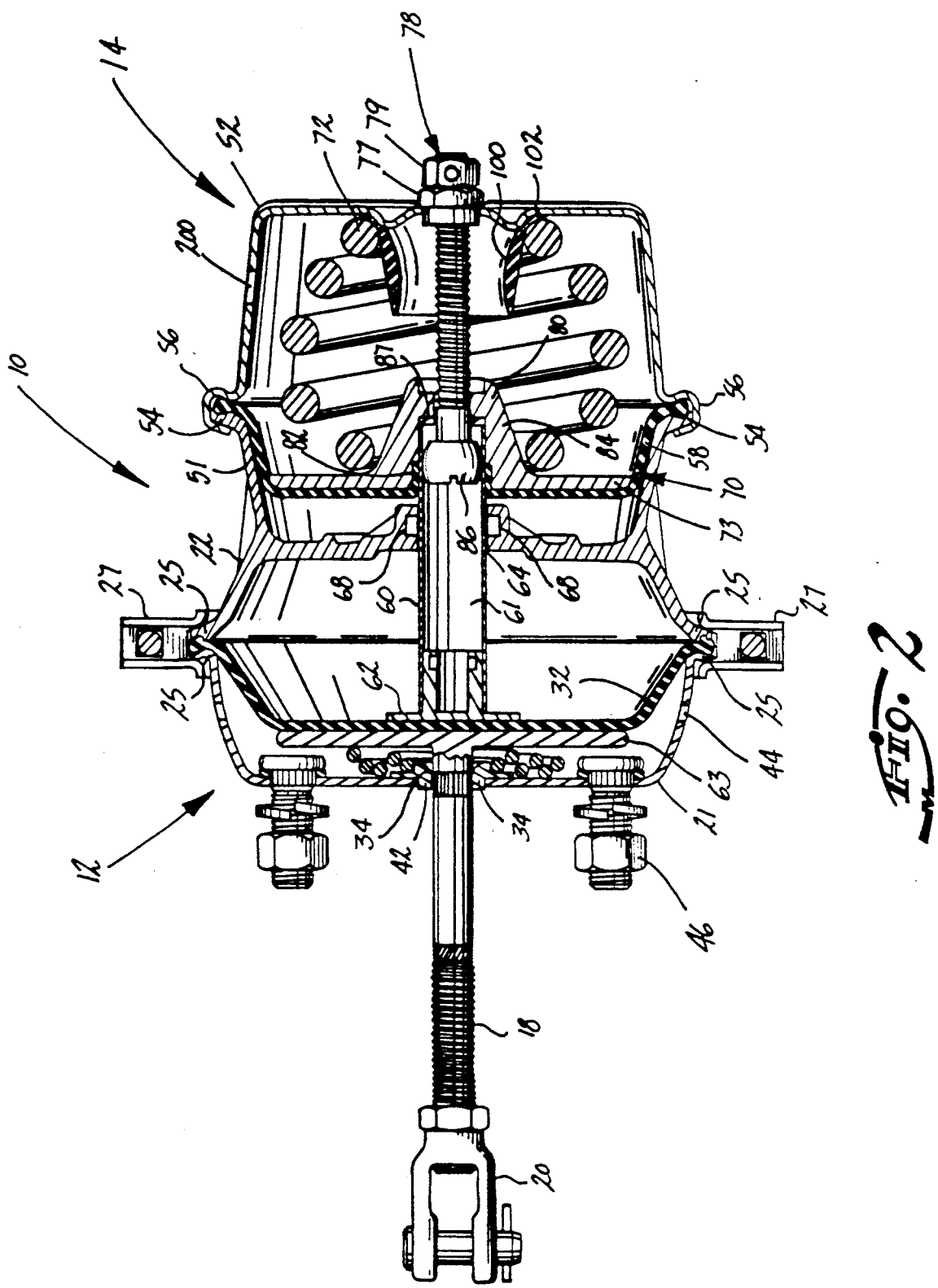
FIG. 2 is cross-sectional view of the brake actuating assembly of FIG. 1, shown with the spring brake actuator in the actuating position.

The force of spring 72 causes actuator rod 60 to be extended through the central opening 64 and causes the reaction plate 62 to apply a force to the diaphragm 32 and pressure plate 36 of the service brake 12. This action causes the service brake push rod 18 to be actuated and the brake to be applied. The resulting fully extended position of the actuator rod 60 is shown in FIG. 2. When the brake is to be released, compressed air is once again introduced in the space between housing section 51 and diaphragm 58. The force of the compressed air against diaphragm 58 causes pressure plate 70, rod 60 and spring 72 to be returned to the position depicted in FIG. 1.

The actuator rod 60 preferably is a hollow tube or rod provided with a central bore 61 to accommodate a brake release or caging rod or tool 78. The distal end is closed by the reaction plate 62, but the proximal end is open and an aperture is provided in the pressure plate 70 to permit the caging rod 78 to extend therethrough.

The tool 78 is used to manually release the spring brake or to ensure that the compression spring 72 will remain compressed when maintenance functions are performed on the brake assembly. The tool 78 preferably is a bolt or the like threaded into a fixed threaded opening such as nut 77 affixed by welding to the end wall of housing section 52. A hexhead nut 79 is fixedly attached to the threaded bolt to facilitate threading the bolt into and out of the chamber 14 by a common wrench or the like. The end of the caging rod 78 within the actuator rod 60 has an enlarged head or plate 86.

The actuator rod 60 extends through the diaphragm 58 at a central opening 81. The opening 81 may be formed with a peripheral flange tubular section or collar 82 circumferentially engaging the outer surface of the actuator rod 60 and may be attached to that surface by a suitable adhesive. Alternatively, the central opening 81 may be of a diameter somewhat smaller than that of actuator rod 60 to provide excess material for a collar or annular edge adjacent actuator rod 60. As noted earlier, the pressure plate 70 is provided with a tubular section 74 which is circumferentially press-fit on the proximal end of push rod 60. The tubular section 74 of the pressure plate 70 is provided with an expanded portion 84 which accommodates the collar 82 of the diaphragm 58 and further presses the collar 82 against the outside surface of actuator rod 60 to maintain an airtight attachment between the push rod 60 and diaphragm 58.

An inwardly directed annular shoulder 80 in the tubular section 74 provides positive engagement with the actuator rod 60 when the rod is actuated and further serves as an engagement surface for caging rod head 86. In the embodiment shown, a steel washer 87 is provided to partially close the open end of the actuator rod 60 and provides a surface against which the caging rod head 86 will bear when the caging rod 78 is withdrawn. The washer 87 prevents galling between the caging rod head 86 and the tubular section 74 of the pressure plate 70. Upon withdrawal, the tool 78 retains the compression spring 72 in its compressed state. Otherwise, the tool 78 extends into the central bore 61 of actuator rod 60 by a sufficient distance to allow the actuator rod 60 to extend to its full length of travel without engagement between the washer 87 and caging rod head 86. The caging tool 78 can, for example, be a steel bolt and the standard hexagonal head of such a bolt may serve the function of the caging rod 86. Alternatively, the caging rod head 86 can comprise a piston, sized to move snugly within the actuator rod 60, and providing additional guidance and stabilization for the travel of the pressure plate 70 and spring 72 within the spring chamber 14.

The portion of the spring chamber 14 carrying the power spring 72 is vented to the atmosphere through vents 200 in the housing section 52 to allow the diaphragm 58 to move freely within the spring chamber 14 in response to the air pressure in the portion of the spring chamber 14 between the diaphragm 58 and the cup shaped housing section 51. Particulate matter may thus be sucked or blown into the power spring 72 portion of the spring chamber 14 while the vehicle is in motion. Consequently, the power spring 72, pressure plate 70 and other major components in that portion of the spring chamber 14 are coated to inhibit corrosion from water and salt which may enter therein. Nevertheless, particulate matter may build up within the hollow aperture 61 of the actuator tube 60, and thus affect travel of the caging rod head 86 therein.

In accordance with the invention, a dust guard 100 is provided to deter introduction of contaminants into the actuator rod 60. The dust guard 100 is formed of rubber, or any other appropriate elastomeric material, and comprises a short tube, having an outwardly extending annular flange 102 at one end, the flange 102 being disposed between the power spring 72 and the cup shaped housing 52 to retain the dust guard 100 in place. As the dust guard 100 extends inwardly of the spring chamber 14 its diameter decreases slightly, while its wall thickness first increases and then decreases, thus forming a low profiled nozzle cross-sectional shape.

Figure 3:
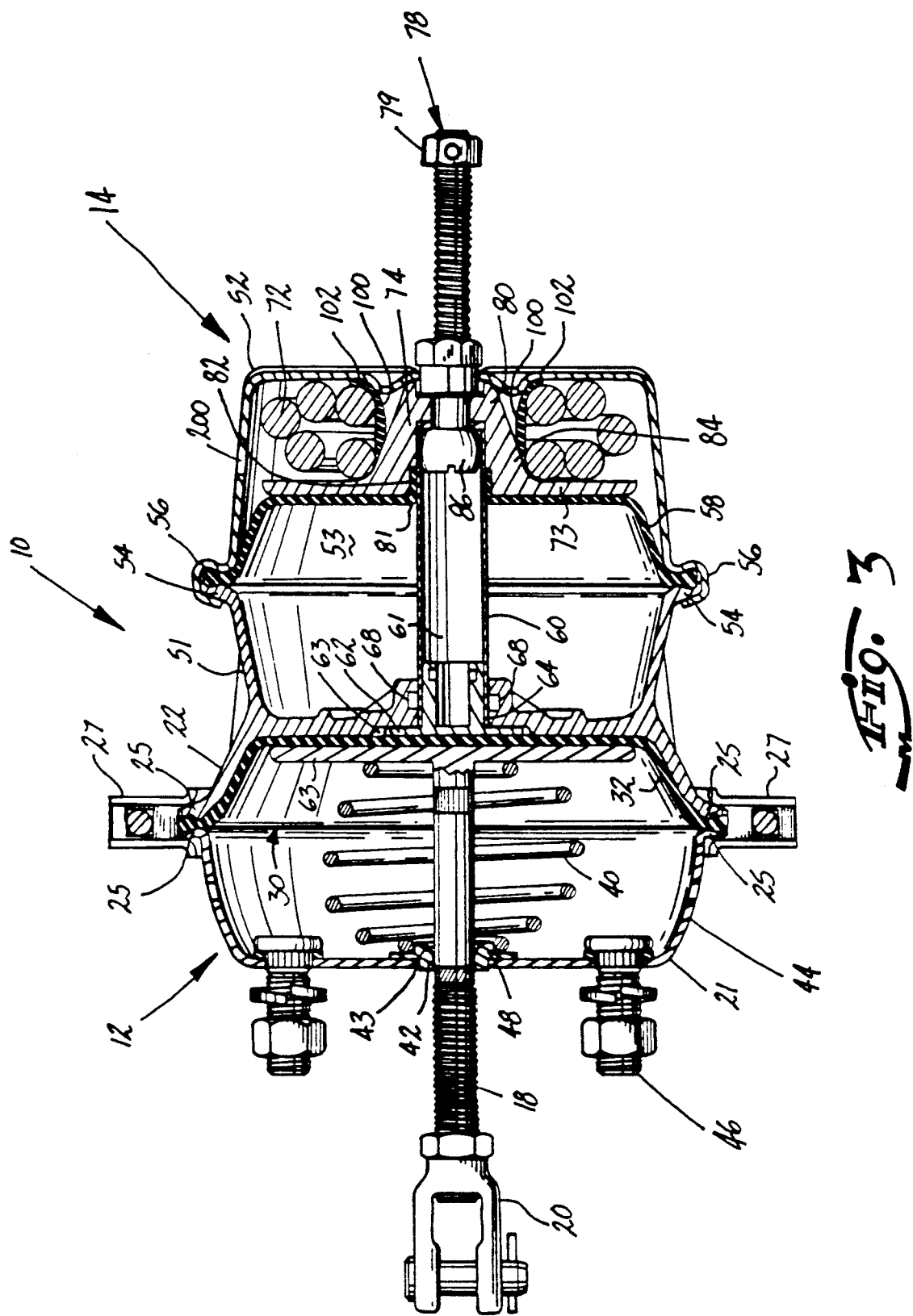
FIG. 3 is a cross-sectional view of the brake assembly of FIG. 1, shown with the spring brake actuator caged.

The conical tubular portion 74 of the pressure plate 70 enters the dust guard 100 when the power spring 72 is retracted. The dust guard 100 expands slightly to receive, and sealingly engage, the tubular portion 74 of the pressure plate 70 in order to deter introduction of contaminants into the interior portions 61 of the actuator rod 60. It will be apparent that the dust guard 100 seals the actuator rod 60 primarily when the vehicle is moving (FIG. 1), or when the power spring 72 is caged (FIG. 3), but not when the vehicle is parked. However, there is less need to seal the actuator rod 60 when the vehicle is at rest, because less dust laden air moves about the spring chamber 53.

Figure 4:
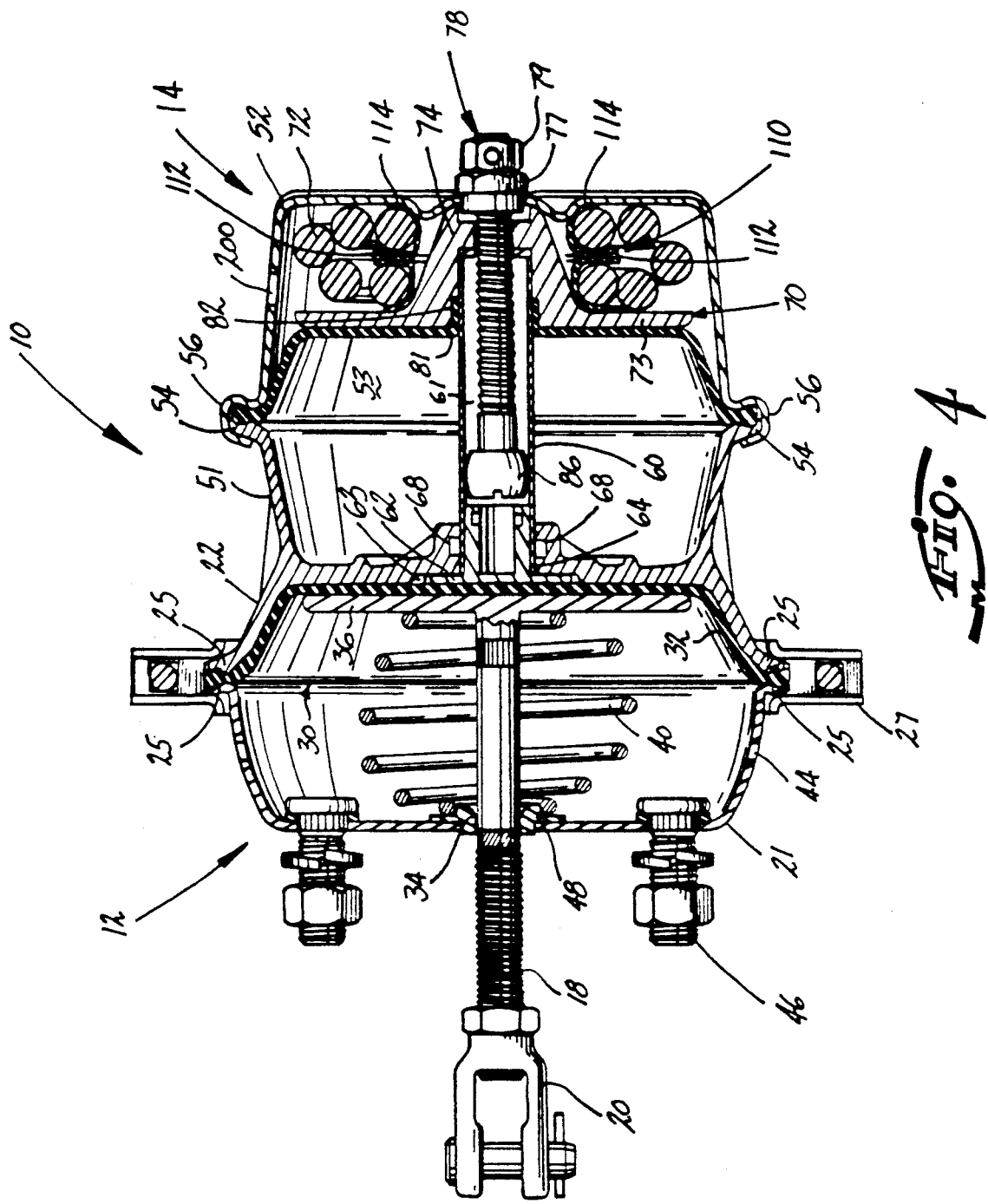
FIG. 4 is a cross-sectional view of a second embodiment of an air operated brake actuating assembling having a spring brake actuator arrangement in accordance with principles of this invention, shown with the spring brake actuator not actuated.
Figure 5:
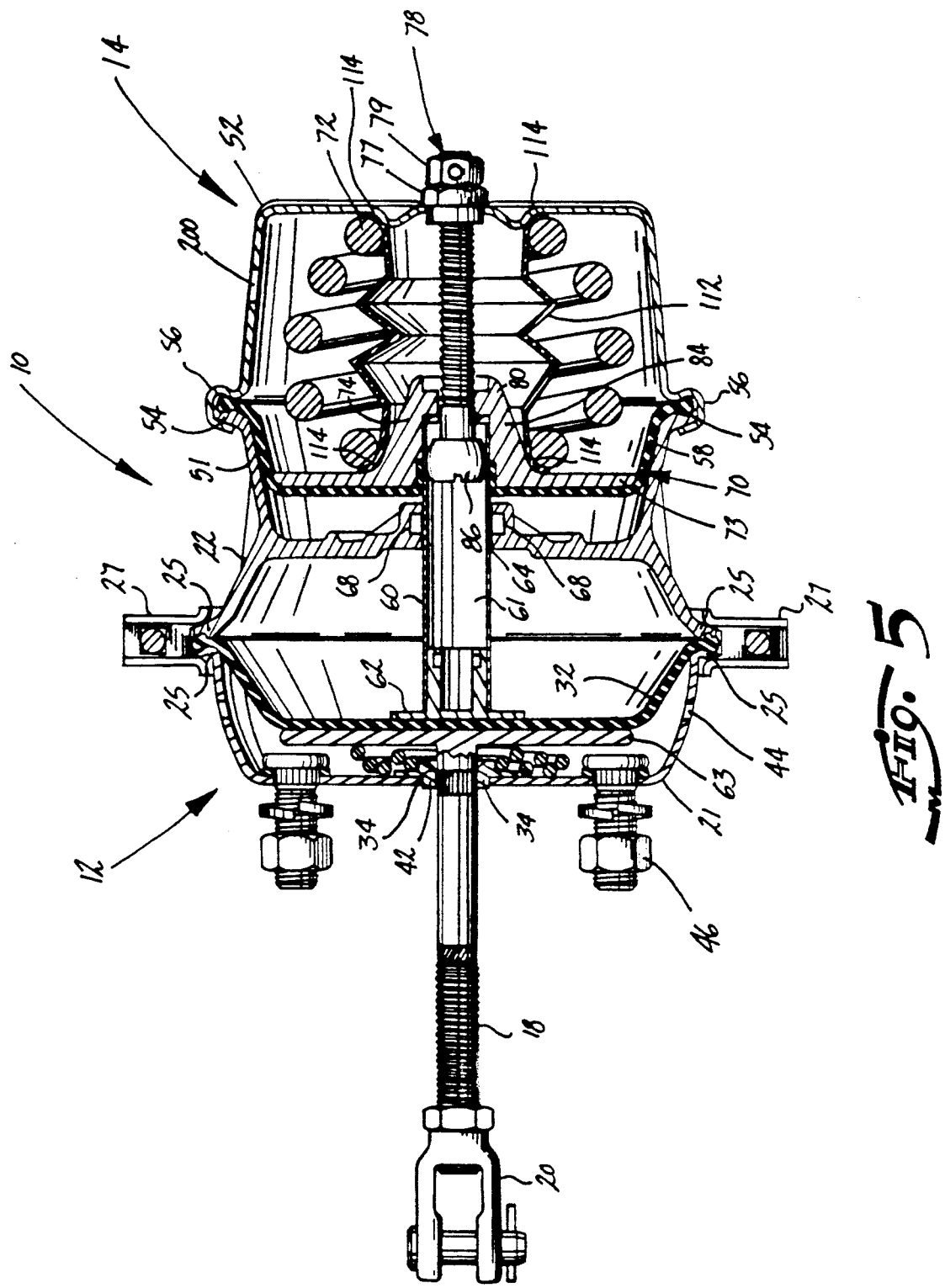
FIG. 5 is a cross-sectional view of the brake actuating assembly of FIG. 4, shown with the spring brake actuator actuated.
Figure 6:
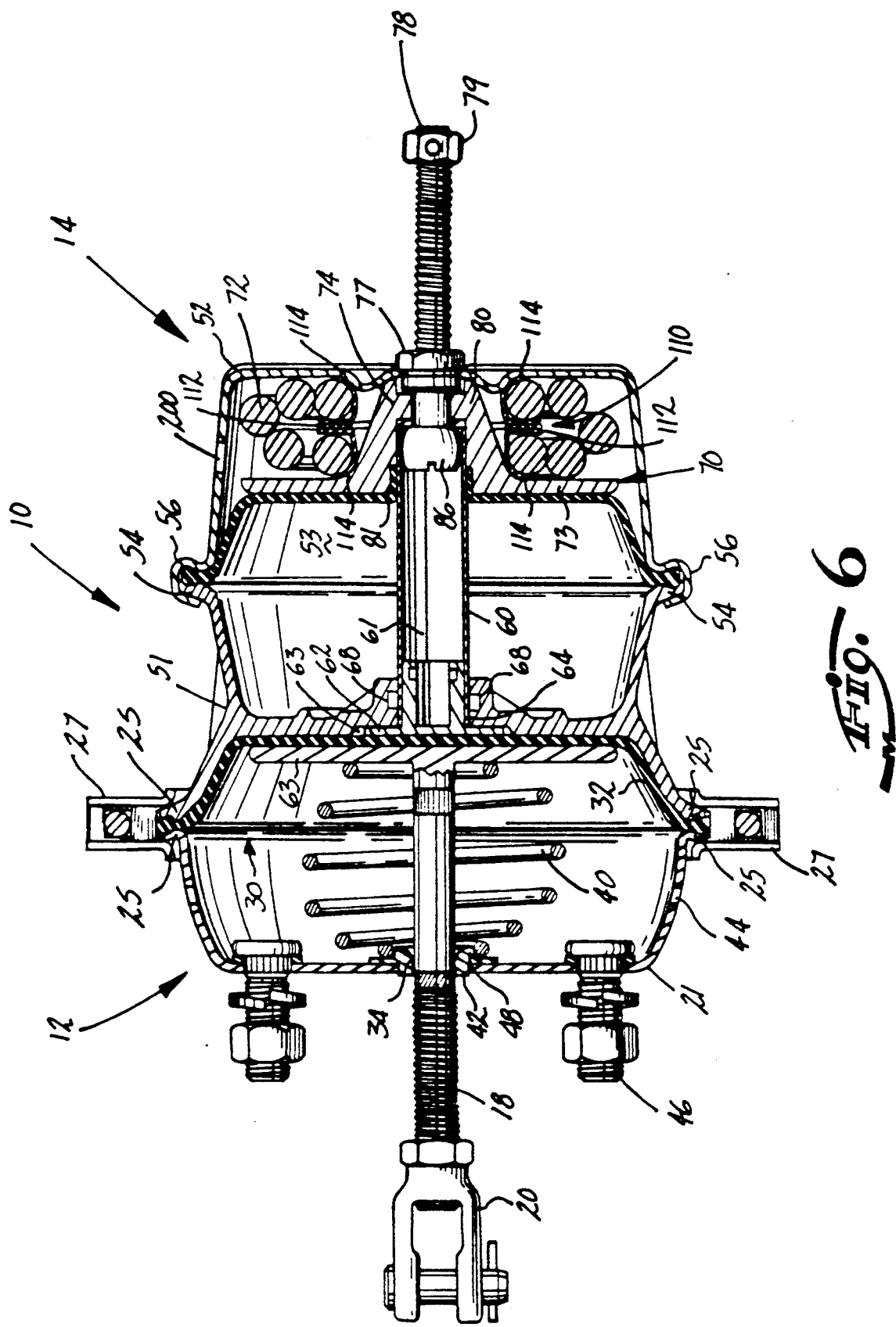
FIG. 6 is a cross-sectional view of the brake actuating assembly of FIG. 4, shown with the spring brake actuator caged.

An alternative embodiment of a dust guard 110 shown in FIGS. 4 through 6 seals the actuator rod 60 at all times. The dust guard 110 comprises a tubular bellows 112 having at least one annular flange 114 at an end thereof, although in the illustrated embodiment, flanges 114 are provided at both ends. The annular flanges 114 are disposed between the power spring 72 and the cup shaped housing portion 52 at one end of the dust guard, and between the power spring 72 and the pressure plate 70 at the opposite end of the dust guard 110 to seal and enclose the opening to the interior 61 of the actuator tubes 60 at the end edge 80. The dust guard 110 effectively seals the actuator tube interior 61 from the interior of the spring chamber 14 both while the vehicle is moving (FIG. 4), and while the vehicle is parked and the power spring 72 is extended (FIG. 5).

Reasonable variation and modification are possible within the scope of the foregoing disclosure without departing from the spirit of the invention.

The embodiments of the invention in which an exclusive property or privilege is claimed are defined as follows:

1. A brake actuating mechanism comprising:
   a housing having first and second end walls with an opening centrally disposed in the first end wall;
   an elastomeric diaphragm suspended within the housing and dividing the interior thereof into a first chamber and a second chamber, said diaphragm having a centrally disposed opening;

a hollow brake actuating rod disposed substantially in the first chamber for reciprocating movement between a retracted position and an extended position and having an interior space, a first end, and a second end, the actuating rod first end extending through the opening in the first end wall, and the actuating rod second end being open and extending into the second chamber through the diaphragm opening; and a dust guard comprising a flexible tubular barrier disposed in a position to surround the actuating rod and having a first end and a second end, the tubular barrier second end in sealing engagement with the housing second end wall to seal the interior of the dust guard at the second end wall, and the tubular barrier first end projecting into the second chamber from the second end wall in sealing relationship with the actuating rod at least when the actuating rod is in the retracted position, whereby the interior space of the actuating rod will be effectively isolated from the remainder of the second chamber at least when the actuating rod is in the retracted position to prevent dirt buildup within the interior space of the actuating rod.

2. A brake actuating mechanism according to claim 1 wherein the tubular wall is formed of an elastomeric material.

3. A brake actuating mechanism according to claim 1 and further comprising an annular spring plate mounted in said housing second chamber, said spring plate being secured to said second end of said hollow brake actuating rod; a threaded caging bolt mounted to said housing and extending into the interior of said hollow brake actuating rod, said threaded caging bolt having on an inner end thereof an enlarged head received within said hollow brake actuating rod and forming a guide for said hollow brake actuating rod; and wherein said tubular barrier first end is in sealing engagement with said spring plate at least when said hollow brake actuating rod is in the retracted position.

4. A brake actuating mechanism according to claim 1 wherein the first end of the barrier is open and adapted to sealingly engage the actuating rod only when the second end of the actuating rod is in the retracted position.

5. A brake actuating mechanism according to claim 4 further comprising a spring disposed within the second chamber between the second end wall and the diaphragm, and an annular flange extending outwardly radially from the second end of the dust guard, which is disposed between the spring and the second end wall of the housing to attach the dust guard to the second end wall.

6. A brake actuating mechanism according to claim 4 wherein the tubular barrier comprises a wall tapering in thickness in the direction of the first end to more readily receive the actuating rod.

7. A brake actuating mechanism according to claim 1 wherein the first end of the dust guard is attached to the actuating rod and the barrier is flexible whereby the first end of the dust guard can move with the actuator without breaching the dust guard.

8. A brake actuating mechanism according to claim 7 wherein the barrier has annular accordion folds for flexibility.

9. A brake actuating mechanism according to claim 7 further comprising a spring disposed within the second chamber between the second end wall and the diaphragm, and first and second annular flanges extending outwardly radially from the first and second end respectively of the dust guard, the first annular flange being disposed between the spring and the actuator to attach the dust guard to the actuator, and the second annular flange being disposed between the spring and the second end wall of the housing to attach the dust guard to the second end wall.

10. In a spring brake comprising a housing having first and second end walls, an elastomeric diaphragm suspended within the housing and dividing the interior thereof into a first chamber and a second chamber, a brake actuating rod disposed within the housing for reciprocating movement between an extended position and a retracted position and having a first end and a second end, the second end being disposed within the second chamber and directed towards the second end wall of the housing, and a spring disposed within the second chamber between the second end wall and the diaphragm, the improvement comprising;

a dust guard having a flexible tubular barrier disposed in a position to surround the brake actuating rod at least when the brake actuating rod is in the retracted position, said tubular barrier having a tubular wall, a first end and a second end, the tubular barrier second end in sealing engagement with the second end wall to seal the dust guard at the housing second end wall, and the tubular barrier first end projecting into the second chamber from the housing second end wall in a position to effectively isolate the actuating rod second end from the remainder of the second chamber at least when the actuating rod is in the retracted position.

11. A dust guard according to claim 10 wherein the first end of the barrier is open and adapted to receive the actuating rod second end only when the second end of the actuating rod is in the retracted position.

12. A dust guard according to claim 11 wherein the dust guard has an annular flange extending radially outwardly from the second end of the dust guard and disposed between the spring and the second end wall of the housing to attach the dust guard to the second end wall.

13. A dust guard according to claim 10 wherein the tubular barrier comprises a wall tapering in thickness in the direction of the first end to more readily receive the actuator.

14. A dust guard according to claim 10 wherein the first end of the dust guard is attached to the actuating rod, and the barrier is collapsible whereby the first end of the barrier can move with the actuating rod without breaching the barrier.

15. A dust guard according to claim 14 wherein the barrier has annular accordion folds for flexibility.

16. A dust guard according to claim 14 further comprising a first and second annular flanges extending outwardly radially from the first and second ends respectively of the dust guard, the first annular flange being disposed between the spring and the diaphragm to attach the dust guard to the actuating rod, and the second annular flange being disposed between the spring and the second end wall of the housing to attach the dust guard to the second end wall.

17. A dust guard according to claim 11 wherein the tubular barrier is formed of an elastomeric material.

18. A dust guard according to claim 11 and further comprising an annular spring plate mounted in said housing second chamber, said spring plate being secured to said second end of said hollow brake actuating rod; a threaded caging bolt mounted to said housing and extending into the interior of said hollow brake actuating rod, said threaded caging bolt having at an inner end thereof an enlarged head received within said hollow brake actuating rod and forming a guide for said hollow brake actuating rod; and wherein said tubular barrier second end is in sealing engagement with said spring plate at least when said hollow brake actuating rod is in the retracted position.

* * * * *